(12) United States Patent
Hallek

(10) Patent No.: US 10,571,564 B2
(45) Date of Patent: Feb. 25, 2020

(54) METHOD FOR DETECTING AT LEAST ONE OBJECT IN A SURROUNDING AREA OF A MOTOR VEHICLE, DRIVER ASSISTANCE SYSTEM AND MOTOR VEHICLE

(71) Applicant: VALEO Schalter und Sensoren GmbH, Bietigheim-Bissingen (DE)

(72) Inventor: Michael Hallek, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 305 days.

(21) Appl. No.: 15/516,931

(22) PCT Filed: Oct. 14, 2015

(86) PCT No.: PCT/EP2015/073734
§ 371 (c)(1),
(2) Date: Apr. 5, 2017

(87) PCT Pub. No.: WO2016/059087
PCT Pub. Date: Apr. 21, 2016

(65) Prior Publication Data
US 2017/0299717 A1    Oct. 19, 2017

(30) Foreign Application Priority Data
Oct. 15, 2014   (DE) .................... 10 2014 114 999

(51) Int. Cl.
*G01S 13/93*   (2006.01)
*G01S 15/87*   (2006.01)
(Continued)

(52) U.S. Cl.
CPC ............ *G01S 13/931* (2013.01); *G01S 7/539* (2013.01); *G01S 13/08* (2013.01); *G01S 15/08* (2013.01);
(Continued)

(58) Field of Classification Search
CPC ........ G01S 13/931; G01S 13/08; G01S 13/46; G01S 13/87; G01S 2013/9314;
(Continued)

(56) References Cited

U.S. PATENT DOCUMENTS 6,414,745 B1 * 7/2002 Moriya ..................... G01C 5/00
342/123
6,810,330 B2 * 10/2004 Matsuura .............. G01S 17/936
340/435

(Continued)

FOREIGN PATENT DOCUMENTS

CN        2935181 Y      8/2007
CN      102456131 A      5/2012
(Continued)

OTHER PUBLICATIONS

First Office Action in corresponding Chinese Application No. 2018102902138670, dated Nov. 1, 2018 (15 pages).

(Continued)

*Primary Examiner* — Bernarr E Gregory
(74) *Attorney, Agent, or Firm* — Osha Liang LLP

(57) ABSTRACT

The invention relates to a method for detecting at least one object (9a, 9b, 9c) in a surrounding area (7) of a motor vehicle (1) by means of a driver assistance system (2), in which a transmission signal is transmitted in each of chronologically consecutive measurement cycles via a distance sensor (4), and a first and a second echo of the transmission signal reflected by the at least one object (9a, 9b, 9c) are received; and, by means of a control device (3), a first distance value (a1) is determined based on the first echo, a second distance value (a2) is determined based on the second echo, and a height of the at least one object (9a, 9b, 9c) is determined based on the first and the second distance value (a1, a2); wherein the measurement cycles are carried out during a relative movement of the motor vehicle (1) with (Continued)

Figure 1:
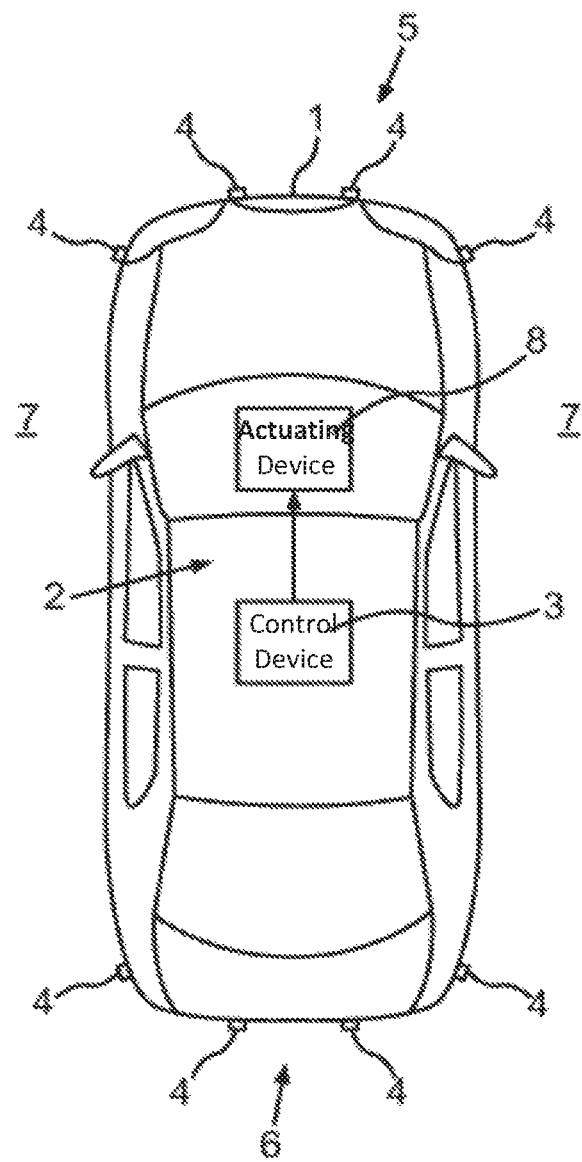

respect to the at least one object (9a, 9b, 9c); in at least two of the measurement cycles, a difference value is determined in each case, which describes a difference between the second distance value (a2) and the first distance value (a1); and the height of the at least one object (9a, 9b, 9c) is determined based on a change in the respective difference value determined in the at least two measurement cycles.

12 Claims, 2 Drawing Sheets

(51) Int. Cl.
| | |
|---|---|
| G01S 7/539 | (2006.01) |
| G01S 17/93 | (2006.01) |
| G01S 17/08 | (2006.01) |
| G01S 15/08 | (2006.01) |
| G01S 13/08 | (2006.01) |
| G01S 15/93 | (2006.01) |
| G01S 17/87 | (2006.01) |
| G01S 7/41 | (2006.01) |
| G01S 13/87 | (2006.01) |
| G01S 13/931 | (2020.01) |
| G01S 15/931 | (2020.01) |
| G01S 13/00 | (2006.01) |
| G01S 15/00 | (2006.01) |
| G01S 17/00 | (2006.01) |
| G01S 17/933 | (2020.01) |

(52) U.S. Cl.
CPC ............ *G01S 15/87* (2013.01); *G01S 15/931* (2013.01); *G01S 17/08* (2013.01); *G01S 17/936* (2013.01); *G01S 7/41* (2013.01); *G01S 13/87* (2013.01); *G01S 17/87* (2013.01); *G01S 17/933* (2013.01); *G01S 2013/9314* (2013.01); *G01S 2013/9346* (2013.01); *G01S 2013/9364* (2013.01); *G01S 2013/9367* (2013.01); *G01S 2013/9375* (2013.01); *G01S 2013/9378* (2013.01); *G01S 2015/932* (2013.01); *G01S 2015/933* (2013.01); *G01S 2015/937* (2013.01)

(58) Field of Classification Search
CPC ..... G01S 2013/9346; G01S 2013/9364; G01S 2013/9367; G01S 2013/9375; G01S 2013/9378; G01S 2013/882; G01S 7/41; G01S 7/539; G01S 15/08; G01S 15/87; G01S 15/931; G01S 17/08; G01S 17/936; G01S 17/87; G01S 17/933; G01S 2015/933; G01S 2015/932; G01S 2015/937

See application file for complete search history.

(56) References Cited

U.S. PATENT DOCUMENTS

| | | | | |
|---|---|---|---|---|
| 2006/0044177 | A1* | 3/2006 | Wittenberg | G01S 13/426 342/25 A |
| 2006/0220910 | A1* | 10/2006 | Becker | B60Q 9/006 340/932.2 |
| 2008/0111733 | A1* | 5/2008 | Spyropulos | G01S 7/412 342/189 |
| 2009/0015462 | A1* | 1/2009 | Nakanishi | G01S 13/931 342/107 |
| 2009/0095084 | A1* | 4/2009 | Barth | G01S 15/931 73/597 |
| 2011/0221628 | A1* | 9/2011 | Kamo | G01S 13/931 342/70 |
| 2012/0119937 | A1* | 5/2012 | Yamada | G01S 13/931 342/70 |
| 2013/0082868 | A1* | 4/2013 | Ohkado | G01S 13/931 342/70 |
| 2013/0335260 | A1* | 12/2013 | Kuehnle | G01S 13/931 342/70 |
| 2014/0062762 | A1* | 3/2014 | Kurono | G01S 13/931 342/146 |
| 2015/0234045 | A1* | 8/2015 | Rosenblum | G01S 13/931 342/71 |

FOREIGN PATENT DOCUMENTS

| | | |
|---|---|---|
| CN | 103487810 A | 1/2014 |
| CN | 103837139 A | 6/2014 |
| CN | 103868519 A | 6/2014 |
| DE | 10 2007 035219 A1 | 1/2009 |
| DE | 10 2007 039348 A1 | 2/2009 |
| EP | 1 764 630 A1 | 3/2007 |
| EP | 1 643 271 B1 | 10/2007 |
| EP | 1 923 717 A1 | 5/2008 |
| EP | 1 910 866 B1 | 9/2011 |
| EP | 1 308 751 B1 | 7/2012 |

OTHER PUBLICATIONS

International Search Report issued in PCT/EP2015/073734 dated Dec. 22, 2015 (6 pages).
Written Opinion of the International Searching Authority issued in PCT/EP2015/073734 dated Dec. 22, 2015 (7 pages).

* cited by examiner

METHOD FOR DETECTING AT LEAST ONE OBJECT IN A SURROUNDING AREA OF A MOTOR VEHICLE, DRIVER ASSISTANCE SYSTEM AND MOTOR VEHICLE

The present invention relates to a method for detecting at least one object in a surrounding area of a motor vehicle by means of a driver assistance system, in which a transmission signal is transmitted in each of chronologically consecutive measurement cycles via a distance sensor, and a first and a second echo of the transmission signal reflected by the at least one object are received; and, by means of a control device, a first distance value is determined based on the first echo, a second distance value is determined based on the second echo, and a height of the at least one object is determined based on the first and the second distance value. The present invention also relates to a driver assistance system for a motor vehicle. Finally, the present invention relates to a motor vehicle including such a driver assistance system.

Interest is presently directed in particular to distance sensors, via which a distance of a motor vehicle from an object may be determined. Such distance sensors may, for example, be configured as ultrasonic sensors, radar sensors, or optical sensors. Driver assistance systems are known from the prior art which assist the driver when driving the motor vehicle, based on the data of such distance sensors. For example, ultrasonic sensors are used to detect a distance from an obstacle in the surrounding area of the motor vehicle. For certain applications such as autonomous parking, or for autonomous braking operations, there are different approaches for determining the height of objects with the aid of distance sensors. Thus, for example, it is possible to differentiate between tall and low obstacles or objects. Here, it is in particular of crucial importance that the object height which is estimated or determined corresponds to the actual height of the object. Based on this piece of information, for example, a decision for braking intervention is made which defines whether or not an object can be driven over, i.e., whether or not it is a low object.

Present methods for estimating the height of an object calculate either the difference between the approach to the object and the distance traveled. This method assumes excellent, performance-sensitive calculation of the vehicle's own movement, wherein in this case, the crucial issue is the unknown movement of the object itself. Thus, this method is effective only with stationary objects. In addition, methods are known from the prior art in which multiple echoes of a transmission signal transmitted by the distance sensor are detected, and in which the height of the second echo is determined. In this case, use is made of the knowledge that in the case of tall obstacles, there are generally multiple signal paths to the obstacle. The first path is the direct echo; the second signal path is, for example, the reflection of the echo via the ground. This signal path is thus somewhat longer. If two echoes follow one another in rapid succession in a certain direction, it may, for example, be assumed that the object may be understood to be tall.

In this context, EP 1 308 751 B1 describes a method for operating a short-range recognition system for a motor vehicle. Here, the height of the object may be determined based on the echo signals of a distance sensor. In this case, it is also provided that the motor vehicle travels toward the object to be detected.

Furthermore, EP 1 643 271 B1 describes a method for classifying side boundaries in a parking space for a system for parking a motor vehicle. In this case, the echo pulses of a distance sensor are evaluated for classifying the ascertained side boundary. Here, in particular the amplitude and a pulse length of the echo pulse are compared to predefinable threshold values.

In addition, EP 1 910 866 B1 describes a method for determining the depth of a parking space using ultrasonic vehicle sensors. In this case, the dispersion and/or the distribution of the echo signals of an ultrasonic sensor are checked. The depth is determined if the dispersion range of all and/or multiple propagation times and/or distances forming a concentration within the distribution is below a predefinable threshold value.

The object of the present invention is to demonstrate an approach for more reliably determining the height of an object in a driver assistance system which uses distance sensors.

This object is achieved according to the present invention via a method, via a driver assistance system, and via a motor vehicle having the features according to the respective independent patent claims. Advantageous embodiments of the present invention are the subject matter of the dependent patent claims, the description and the figures.

One method according to the present invention is used for detecting at least one object in a surrounding area of a motor vehicle by means of a driver assistance system. Here, a transmission signal is transmitted in each of chronologically consecutive measurement cycles via a distance sensor, and a first and a second echo of the transmission signal reflected by the at least one object are received. In addition, by means of a control device, a first distance value is determined based on the first echo, a second distance value is determined based on the second echo, and a height of the at least one object is determined based on the first distance value and the second distance value. The measurement cycles are carried out during a relative movement of the motor vehicle with respect to the at least one object. For at least two of the measurement cycles, a difference value is determined in each case, which describes a difference between the second and the first distance value, and the height of the at least one object is determined based on the change in the respective difference value determined in the at least two measurement cycles.

The method is used for detecting at least one object in surroundings of the motor vehicle. One or multiple objects in the surrounding area of the motor vehicle are thus to be characterized. In particular, the height of the at least one object is to be determined. For this purpose, a plurality of measurement cycles is carried out via a distance sensor of the driver assistance system. The distance sensor may, for example, be a radar sensor, a laser scanner or an ultrasonic sensor. A transmission signal is transmitted via the distance sensor in each of the measurement cycles. This transmission signal is reflected by the at least one object in the surrounding area of the motor vehicle and again strikes the distance sensor as an echo. In this case, multiple echoes of the transmission signal are generally received. A distance between the distance sensor and the object may be determined based the propagation time between the transmission of the transmission signal and the reception of the respective echo. On the basis of the first echo, a first distance value is determined based on the propagation time between the transmission of the transmission signal and the reception of the first echo. In addition, a second distance value is determined based on the propagation time between the transmission of the transmission signal and the reception of the second echo.

While the measurement cycles are being carried out, the motor vehicle may be moved relative to the at least one object. The motor vehicle may thus move toward the at least one object. Alternatively, the motor vehicle may move away from the at least one object. It may also be provided that the at least one object moves. In each of the measurement cycles, a difference value is determined which describes the difference between the second and the first distance value. The difference value is compared from at least two of the measurement cycles, in particular chronologically consecutive measurement cycles. Thus, a first difference value which is determined during a first measurement cycle is compared to a second difference value which is determined during a second measurement cycle. A change in the difference value between two measurement cycles may thereby be determined. This change in the difference value is then used to determine the height of the object.

The present invention is based on the knowledge that different objects demonstrate a difference between the first and the second echo. If only one measurement is carried out, in which the motor vehicle is not moved relative to the at least one object, it is, for example, not possible to distinguish whether the object is one tall object or multiple low objects. For this purpose, the difference between the echoes is determined based on different positions. Thus, the object may be characterized more accurately, and in particular the height of the object may be estimated more reliably.

Preferably, the at least one object is characterized as tall if the change in the difference value exceeds a predetermined threshold value. If the difference value changes with the relative movement of the motor vehicle with respect to the at least one object, it may be assumed that it is a tall object. In this case, it is taken into account that the ratio of the first and the second distance value changes as a function of the distance of the motor vehicle from the object. If the difference value remains essentially constant as a function of time, it may be assumed that the echoes do not originate from reflection from a tall object.

In an additional embodiment, for each of the measurement cycles, a reference value is determined for the difference value, and the reference value is compared to the determined difference value. The reference value may be formed on the basis that a tall object is present in front of the motor vehicle. It may thereby be calculated with high probability how the transmission signal is reflected by the object and via which reflection of the transmission signal the first and the second echo are provided. Thus, a plausibility check of the difference value may be performed via the reference value. Thus, the object may be reliably characterized.

In another embodiment, a tolerance value is taken into account during the comparison of the reference value to the difference value. This tolerance value may be subtracted from the determined difference value. Alternatively or in addition, the determined difference value may be added to the tolerance value. In this way, measurement inaccuracies during the determination of the first and the second distance may be taken into account.

Preferably, the reference value is determined based on an estimated value of the second distance value, which is calculated based on the first distance value. The first echo may be accordingly received by the distance sensor. The first distance value may be calculated based on the first echo. An estimated value is calculated for the second distance value. This value may be determined based on the geometric characteristics between the motor vehicle and the object, wherein it is assumed that the object is tall. The propagation paths of the ultrasonic signal may be accordingly predetermined for a high signal. Thus, an estimated value may be determined for the second distance value. This estimated value may also be used to perform a plausibility check on the determined second distance value which is determined based on the second echo.

Preferably, the estimated value for the second distance value is determined under the assumption that the second echo originates from a reflection of the transmission signal from an area of a base point of the at least one object. 'Base point' is presently to be understood to mean the area of the object at which the object, for example, is adjacent to a surface, in particular a roadway surface. Thus, for example, it may be assumed that the first distance value describes the shortest distance between the distance sensor and the object. Furthermore, it may be assumed that the second distance value describes the distance between the distance sensor and the base point of the object. Therefore, the estimated value for the second distance value, and thus the reference value for the difference value, may be determined in a simple and reliable manner.

Furthermore, it is advantageous if the reference value is determined as a function of an installation height of the distance sensor on and/or in the motor vehicle. The distance sensor may, for example, be arranged in or behind a bumper of the motor vehicle. Alternatively, the distance sensor may be arranged in or behind a body part, for example, a door of the motor vehicle. Based on the piece of information about the installation position of the distance sensor, the relative position between the distance sensor and the object may be determined. In particular, the shortest distance from the object and the shortest distance from the base point of the object may be determined or calculated. In this way, a reference value may reliably be ascertained.

A driver assistance system according to the present invention includes at least one distance sensor and a control device which is designed for carrying out a method according to the present invention. The control device may, for example, be formed by a control device (electronic control unit, ECU) of the motor vehicle.

Preferably, the control device is designed to detect a parking space which is adjacent to the at least one object, based on the height of the at least one object determined via the at least one distance sensor. The control device is designed to determine the height of the object based on the first and the second distance value. Thus, for example, a tall object may be distinguished from a low object. In particular, a curb may thereby be detected. It may in particular be detected whether the obstacle may be driven over or whether the motor vehicle may be moved over the object. Thus, for example, it is possible to distinguish between a parking place marking, a curb and parked vehicles. In this way, a parking space, i.e., a free parking place, may be reliably detected.

In another embodiment, the control device is designed to perform emergency braking, based on the height of the at least one object determined via the at least one distance sensor. Based on the determined height of the object, it may be distinguished whether the object constitutes an obstacle with which a collision is imminent. Furthermore, it may be ascertained whether the motor vehicle may be driven over the object. Based on this piece of information, it may be decided whether or not autonomous emergency braking is initiated.

Furthermore, it is advantageous if the control device is designed to carry out an intervention into a steering system and/or a braking system and/or a drive device of the motor vehicle, based on the height of the at least one object determined via the at least one distance sensor. In other words, the motor vehicle may be at least semi-autonomously maneuvered based on the determined height of the at least one object. For example, an intervention into the steering system of the motor vehicle may take place, while the driver continues to operate the accelerator pedal and the brake. It is also conceivable that the motor vehicle is autonomously maneuvered by means of the control device. In this case, the driver assistance system also takes over the intervention into the brake and the drive device or the drive engine of the vehicle.

A motor vehicle according to the present invention includes a driver assistance system according to the present invention. The motor vehicle is in particular configured as a passenger car.

The embodiments provided with reference to the method according to the present invention and their advantages correspondingly apply to the driver assistance system according to the present invention and to the motor vehicle according to the present invention.

Additional features of the present invention result from the claims, the figures and the description of the figures. All features and combinations of features mentioned above in the description, and the features and combinations of features mentioned below in the description of the figures and/or shown below solely in the figures, are applicable not only in the respective specified combination, but also in other combinations or alone.

The present invention will now be described in greater detail based on a preferred exemplary embodiment and with reference to the appended drawings.

Figure 2:
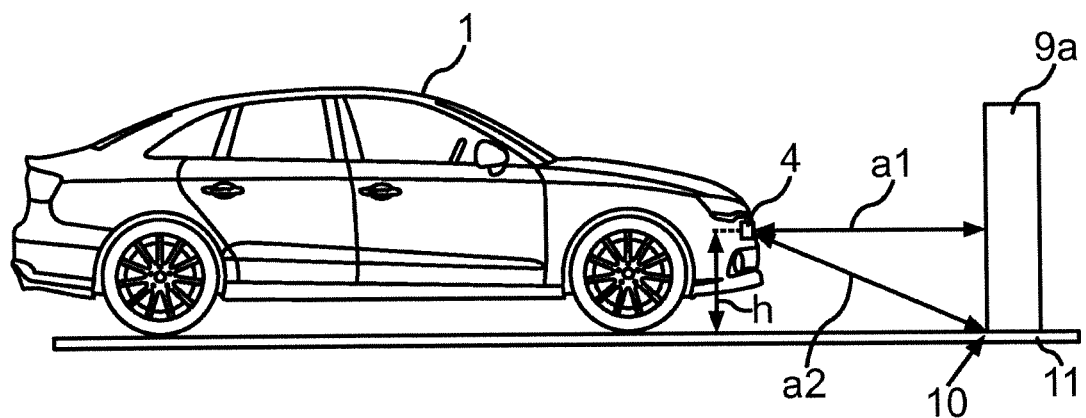
Figure 3:
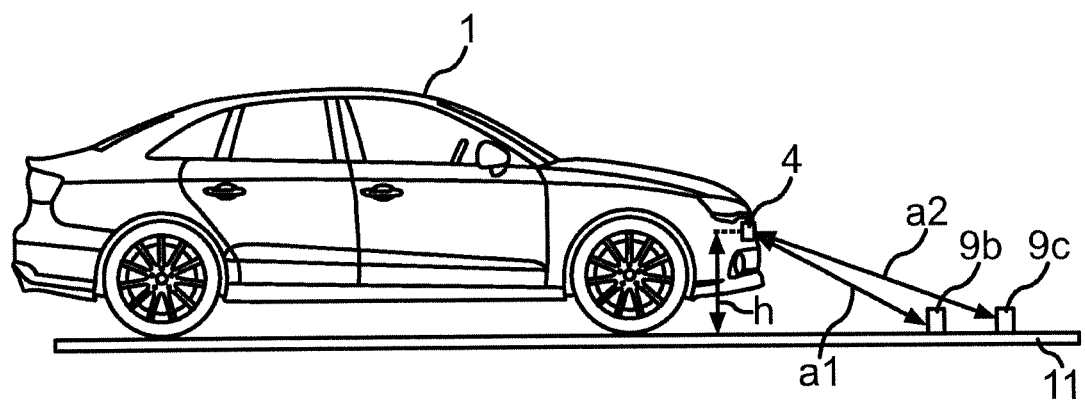

The following are shown:

FIG. 1 a schematic representation of a motor vehicle according to one embodiment of the present invention;

FIG. 2 the motor vehicle according to FIG. 1, which is moved toward a first object; and FIG. 3 the motor vehicle according to FIG. 1, which is moved toward a second and a third object.

FIG. 1 shows a motor vehicle 1 according to one embodiment of the present invention. In the present exemplary embodiment, the motor vehicle 1 is configured as a passenger car. The motor vehicle 1 includes a driver assistance system 2. The driver assistance system 2 may, for example, be configured to autonomously carry out emergency braking. Alternatively or in addition, the driver assistance system 2 may be designed to detect a parking space and to park the motor vehicle 1 at least semi-autonomously in the detected parking space.

The driver assistance system 2 in turn includes a control device 3. The control device 3 may, for example, be formed by a control unit of the motor vehicle 1. In addition, the driver assistance system 2 includes at least one distance sensor 4. In the present exemplary embodiment, the driver assistance system 2 includes eight distance sensors 4. Four distance sensors 4 are arranged in a front section 5 of the motor vehicle 1, and four distance sensors 4 are arranged in a rear section 6 of the motor vehicle 1. The distance sensors 4 are in particular configured to detect at least one object 9a, 9b, 9c in a surrounding area 7 of the motor vehicle 1. In addition, the distance sensors 4 may in particular be designed to detect a distance from the at least one object 9a, 9b, 9c in a surrounding area 7 of the motor vehicle 1. The distance sensors 4 may, for example, be configured as ultrasonic sensors, radar sensors, laser scanners, or the like.

Furthermore, the motor vehicle 1 or the driver assistance system 2 includes an actuating device 8. The actuating device 8 is designed to carry out an intervention into the steering and/or braking systems and/or a drive engine of the motor vehicle 1. The actuating device 8 is connected to the control device 3 for data transmission via a corresponding data cable. Furthermore, the distance sensors 4 are connected to the control device 3 for data transmission. Corresponding data lines are not shown for the sake of clarity.

At least one of the distance sensors 4 is now to be used to determine a height of the object 9a, 9b, 9c. For this purpose, the at least one distance sensor 4 is operated in chronologically consecutive measurement cycles. In each of the measurement cycles, a transmission signal is transmitted via the distance sensor 4. This transmission signal is reflected from the at least one object 9a, 9b, 9c and again strikes the distance sensor 4. The transmission signal is generally reflected multiple times, so that multiple echoes of the transmission signal strike the distance sensor 4.

To determine the height of the at least one object 9a, 9b, 9c, the motor vehicle 1 is moved relative to the object 9a, 9b, 9c. The motor vehicle 1 may, for example, be moved toward the at least one object 9a, 9b, 9c. In each of the measurement cycles, a first distance value a1 is determined based on the propagation time between the transmission of the transmission signal and the reception of the first echo. In addition, a second distance value a2 is determined based on the propagation time between the transmission of the transmission signal and the reception of the second echo. In addition, by means of the control device 3, a difference value is determined which describes a difference between the second distance value a2 and the first distance value a1.

In the present case, the change in the difference value between at least two of the measurement cycles is now determined. Based on the change in the difference value, it may be checked whether the object 9a, 9b, 9c is a tall object or a low object. A reference value may also be used for performing a plausibility check on the difference value. This reference value may, for example, be determined based on an estimated value for the second distance value a2. This estimated value for the second distance value a2 may be determined under the assumption that the object 9a, 9b, 9c is a tall object. This will be explained below based on FIG. 2.

FIG. 2 shows the motor vehicle 1, which is moving toward a first object 9a. The object 9a is a tall object. The present snapshot shows the execution of a measuring cycle. In this case, the transmission signal is transmitted. This signal is reflected by the object 9a. Here, it is assumed that the first distance value a1 describes the shortest distance between the distance sensor 4 and the first object 9a. Furthermore, it is assumed that the second distance value a2 describes the shortest distance between the distance sensor 4 and a base point 10 of the first object 9a. The base point 10 corresponds to the area of the first object 9a which is adjacent to the surface 11, in particular the roadway surface. Furthermore, an installation height h of the distance sensor 4 is known. The installation height h is specified as originating on the surface 11 and running along the vertical axis of the vehicle. In the present exemplary embodiment, the installation height h may, for example, be 40 cm.

For the first distance value a1, for example, a value of 100 cm may result, and for the second distance value a2, for example, a value of 109 cm may result. For calculating the estimated value for the second distance value a2, it may now be assumed that a right angled triangle is formed by the first distance value a1, the second distance value a2, and the installation height h. In this case, the distance value a1 describes the adjacent leg, the installation height h describes the opposite leg, and the second distance value a2 describes the hypotenuse. If the first distance value a1 is determined based on the propagation time between the transmission of the transmission signal and the reception of the first echo, the second distance value a2 may be calculated. This value is calculated from the square root of the installation height h squared plus the first distance value a1 squared. For the aforementioned example, an estimated value of 107.7 cm is obtained. The measured second distance value a2 is 109 cm. With the application of a tolerance value, it may now be determined that the estimated value for the second distance value a2 essentially corresponds to the measured distance value a2. It may thus be assumed that the object is a tall object.

FIG. 3 shows an additional exemplary embodiment, in which the motor vehicle 1 moves toward a second object 9b and a third object 9c. In the present case, the second object 9b and the third object 9c are low obstacles which may be driven over by the motor vehicle 1. In the present case, a value of 100 cm results for the measurement of the first distance value a1, and a value of 119 cm results for the measurement of the second distance value a2. Here, according to the above-described calculation, a value of 107.7 cm results for the estimated value of the second distance value a2. However, a second distance value of 119 cm was measured. Even with the application of a tolerance, the measured second distance value a2 does not match the estimated value for the second distance value a2. It may be assumed that the second echo does not originate from a single object, and in particular not from a tall object.

Here, it is also possible to determine the distance between the second object 9b and the third object 9c based on the distance values a1 and a2. In the present case, it is taken into account that the difference value, i.e., the difference between the second distance value a2 and the first distance value a1, changes in different ways over the distance range between the distance sensor 4 and the object 9a, 9b, 9c. For the exemplary embodiment according to FIG. 3, the difference, which is approximately 20 cm in the present case, remains approximately constant over the entire distance range, so that the same difference value results, for example, for a distance of 300 cm between the distance sensor 4 and the object 9a, 9b, 9c, as well as for short distances, for example, 100 cm.

The difference value according to the example from FIG. 2, which is 9 cm in the present case, varies over the distance range. The difference value is large for large distances between the distance sensor 4 and the object 9a, and small for small distances between the distance sensor 4 and the object 9a. This property may now be used to distinguish the objects 9a, 9b, 9c. In particular, the method may be used if, coincidentally, the difference value, i.e., the distance between the first and the second echo, is identical to a tall and for low objects. Here, it is not possible to make a distinction solely on the basis of the calculation. However, if the motor vehicle 1 moves relative to the object 9a, 9b, 9c, the difference values change and a decision is thus possible. This occurs in particular in the case of short distances between the distance sensor 4 and the object 9a, 9b, 9c.

Thus, a simple algorithm may be provided for determining the height of the object 9a, 9b, 9c. This is independent of the number of distance sensors 4 of the motor vehicle 1. In addition, a rapid estimation of the height of the object 9a, 9b, 9c may be made possible. The method may be made possible is an economical manner and using little computing power.

The invention claimed is:

1. A method for detecting at least one object in a surrounding area of a motor vehicle by means of a driver assistance system, the method comprising:
    transmitting a transmission signal in each of chronologically consecutive measurement cycles via an ultrasonic distance sensor;
    receiving a first and a second echo of the transmission signal reflected by the at least one object in each of the chronologically consecutive measurement cycles; and
    by a control device, determining a first distance value based on the first echo, determining a second distance value based on the second echo, and determining a height of the at least one object based on the first distance value and the second distance value,
    wherein:
    the measurement cycles are carried out during a relative movement of the motor vehicle with respect to the at least one object,
    in at least two of the measurement cycles, a difference value is determined in each case, which describes a difference between the second distance value and the first distance value, and
    the height of the at least one object is determined based on a change in the respective difference value determined in the at least two measurement cycles.

2. The method according to claim 1, wherein the at least one object is characterized as tall when the change in the difference value exceeds a predetermined threshold value.

3. The method according to claim 1, wherein, for each of the measurement cycles, a reference value is determined for the difference value, and the reference value is compared to the determined difference value.

4. The method according to claim 3, wherein a tolerance value is taken into account during the comparison of the reference value to the determined difference value.

5. The method according to claim 3, wherein the reference value is determined based on an estimated value for the second distance value, which is calculated based on the first distance value.

6. The method according to claim 5, wherein the estimated value for the second distance value is determined under the assumption that the second echo originates from a reflection of the transmission signal in an area of a base point of the at least one object.

7. The method according to claim 3, wherein the reference value is determined as a function of an installation height of the distance sensor on and/or in the motor vehicle.

8. A driver assistance system comprising:
    at least one ultrasonic distance sensor; and
    a control device for carrying out a method for detecting at least one object in a surrounding area of a motor vehicle by means of the driver assistance system, the method comprising:
    transmitting a transmission signal in each of chronologically consecutive measurement cycles via the at least one ultrasonic distance sensor;
    receiving a first and a second echo of the transmission signal reflected by the at least one object in each of the chronologically consecutive measurement cycles;
    by the control device, determining a first distance value based on the first echo, determining a second distance value based on the second echo, and determining a height of the at least one object based on the first distance value and the second distance value, wherein:
the measurement cycles are carried out during a relative movement of the motor vehicle with respect to the at least one object,
in at least two of the measurement cycles, a difference value is determined in each case, which describes a difference between the second distance value and the first distance value, and
the height of the at least one object is determined based on a change in the respective difference value determined in the at least two measurement cycles.

9. The driver assistance system according to claim 8, wherein the control device is configured to detect a parking space which is adjacent to the at least one object, based on the height of the at least one object determined via the at least one distance sensor.

10. The driver assistance system according to claim 8, wherein the control device is configured to perform emergency braking, based on the height of the at least one object determined via the at least one distance sensor.

11. The driver assistance system according to claim 8, wherein the control device is configured to carry out an intervention into a steering system and/or a braking system and/or a drive device of the motor vehicle, based on the height of the at least one object determined via the at least one distance sensor.

12. A motor vehicle including a driver assistance system according to claim 8.

* * * * *